F. F. EMORY.
HOISTING JACK FOR FLY WHEELS.
APPLICATION FILED FEB. 16, 1916.
1,218,066.
Patented Mar. 6, 1917.
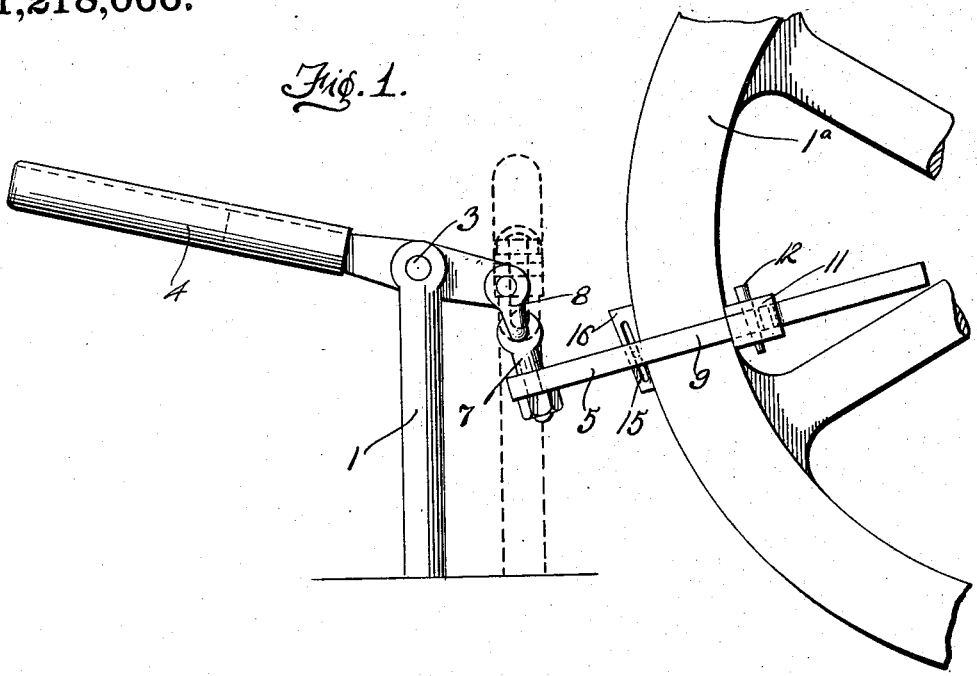
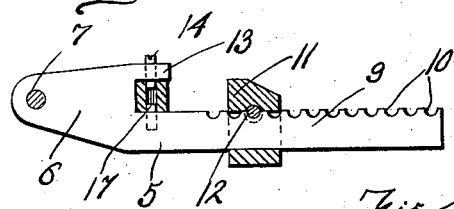
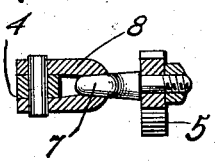
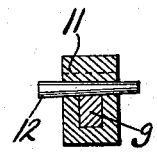
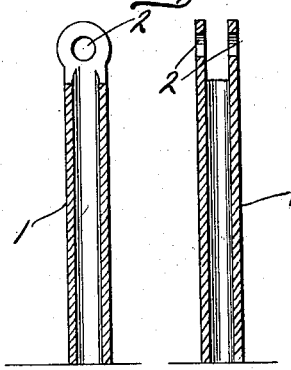
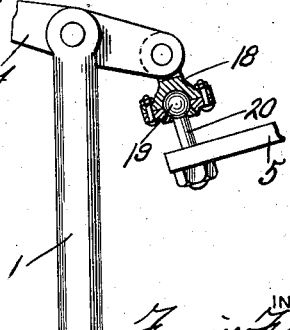
WITNESSES
INVENTOR
Francis F. Emory,
BY
ATTORNEY

UNITED STATES PATENT OFFICE.

FRANCIS F. EMORY, OF FITCHBURG, MASSACHUSETTS.

HOISTING-JACK FOR FLY-WHEELS.

1,218,066.   Specification of Letters Patent.   Patented Mar. 6, 1917.

Application filed February 16, 1916. Serial No. 78,717.

*To all whom it may concern:*

Be it known that I, FRANCIS F. EMORY, a citizen of the United States, residing at Fitchburg, in the county of Worcester and State of Massachusetts, have invented certain new and useful Improvements in Hoisting-Jacks for Fly-Wheels, of which the following is a specification.

This invention relates to jacks and has a special reference to hoisting jacks for fly wheels which may be engaged with the latter, either on the interior or exterior thereof.

An object of importance of this invention is to provide a suitable device to move the fly wheels of an engine for overcoming a dead center, the device being adaptable for use with fly wheel rims of various thicknesses, and being readily movable in its entirety toward the fly wheel, for increasing leverage, consequently, facilitating manipulation.

A further object of the invention is to provide a simplified structure which may be very readily engaged with the fly wheel, and the parts of which are so associated that no complications can arise during phase of movement thereof and all parts being of a simple and durable nature.

Other objects as well as the nature, characteristic features and scope of my invention will be more readily understood from the following description, taken in connection with the accompanying drawings and pointed out in the claims forming a part of this specification.

Referring to the drawings:—

Figure 1 is a side elevational view of a jack constructed in accordance with my invention, illustrating the application thereof;

Fig. 2 is a plan view of the fly wheel engaging arm, portions of the adjoining members thereof being shown in section and in their relative position on the arm, as shown in Fig. 1;

Fig. 3 is a longitudinal sectional view of the supporting standards used in this capacity;

Fig. 4 is a similar view taken through another part of the standards;

Fig. 5 is a detail enlarged sectional view of the connecting means between the operating handle and the fly wheel engaging arm;

Fig. 6 is a sectional view of the fly wheel engaging arm and slidable slot, which is associated therewith, for rigidly engaging the fly wheel with said arm; and Fig. 7 is a detail enlarged side elevational view, partly in section and parts thereof broken away, of a modified form of jack.

In the drawings, in order to illustrate the application of my invention, a portion of a fly wheel 1ª, has been shown, which in this instance comprises a fly wheel of that type in which spokes are used and which engage with the felly or rim of the wheel. It is to be understood, however, that this device is equally applicable on other types of fly wheels now in use.

The hoisting apparatus embodies a tubular standard 1, the upper end of which is bifurcated and the branches of the bifurcation provided with alining openings 2, through which a pin or shaft 3 is engaged, the latter serving as an axis for an operating handle 4. It will be noted that the operating handle is pivotally associated with the standard 1, in close proximity to one of the terminals of said handle in order to insure ample leverage of the handle.

A fly wheel engaging arm 5 is provided, which, in this instance comprises a heel 6, which is equipped with an eye bolt 7, the shank of which is threaded and engaged with a nut. The eye of said bolt is pivotally engaged with the vertex of a clevis 8, the arms of said clevis being in turn pivotally engaged with that terminal of the handle 4, which is nearest the axis of the handle. A portion of the inner terminal of the heel 6 is extended to provide an oblong bar 9, the inner margin of the latter being corrugated to provide successively arranged grooves, as indicated at 10.

Slidably mounted upon the bar 9, is an abutting block 11, the opening thereof, through which the bar 9 is passed, having a tapering groove communicating therewith and in which is mounted a tapered wedge 12. The wedge 12 is adapted for engagement with any one of the grooves 10, whereby the block 11 may be held in a predetermined position upon the bar 9. The inner face of the block 11 is adapted for engagement with the inner periphery of the rim of the wheel 1ª, as shown to advantage in Fig. 1.

A portion 13 of the rear margin of the heel 6 is extended, in parallel relation with the bar 9 and is provided with an opening therein, which receives a keeper 14, the latter being engaged in the elongated slot 15 of a shoe 16, and coacts with a stud 17 which is projected from the inner margin of the bar 9, for supporting the shoe 16. It will be noted that the inner face of the shoe 16 is of an arcuate configuration to conform to the contour of rim of the wheel 1ᵃ, and is adapted for snug engagement therewith, to coöperate with the block 11 for holding the arm 5 in rigid engagement with the rim of the fly wheel.

In Fig. 7, a modified form of connection between the handle 4 and arm 5 is provided, in which instance, a head 18 is in pivotal connection with the spherical head 19 of a bolt 20, the shank of the latter being passed through the heel 6 of the arm 5, in the same manner as the bolt 12 in Fig. 1. It will be noted that the recess in the head 18 flares toward the outer surface thereof so as to permit a swinging movement of the bolt 20, if desired, thereby preventing binding of the parts during movement of the jack and insuring efficient operation at all times.

In operation therefore, it will be appreciated, that the inner face of the bar 9 is engaged with the rim of the fly wheel, and the block 11, then advanced into snug engagement with said rim to coöperate with the shoe 16 for holding the said arm in a rigid position. The supporting standard 1 is then arranged in proximity to said wheel, and pressure then exerted upon the handle 4 to impart rotary movement to the wheel 1ᵃ. It is of course, to be understood, that the supporting standard 1 may be advanced toward the wheel 1ᵃ at any time, in order to increase the leverage of the handle 4, thereby obtaining a greater throw of the fly wheel.

It will be understood that the above description and accompanying drawings comprehend only the general and preferred embodiment of my invention and that various minor changes in details of construction, proportion and arrangement of parts may be made within the scope of the appended claims and without sacrificing any of the advantages of my invention.

Having thus fully described my invention, what I claim as new and desire to secure by Letters Patent is:—

1. A device as specified, including an arm engageable with the rim of a fly wheel, means adjustably mounted on said arm to engage one periphery of the rim, a shoe on said arm to engage the other periphery of the rim, said shoe conforming to the contour of the wheel and being loosely mounted to automatically snugly engage the rim when the arm is elevated, and mechanism to elevate said arm.

2. A device as specified, including a supporting standard, an arm comprising a heel portion having a portion of one of its ends extended to provide a bar, the inner face of which is corrugated, a member extended from said heel in parallelism with the bar, a shoe movably carried between said member and said bar, and adapted for engagement with the rim of a fly wheel, a block movably mounted upon said bar for engagement with the rim of a fly wheel for coöperation with said shoe, means mounted in said block and engaging any one of said corrugations, to rigidly engage the rim of the fly wheel with said bar, and a handle movably mounted upon said supporting structure and in connection with said arm for moving the latter, whereby motion is imparted to said fly wheel.

In testimony whereof I affix my signature in presence of two witnesses.

FRANCIS F. EMORY.

Witnesses:
 LORING P. SEARS,
 EFFIE E. ESKOLA.